United States Patent Office 3,523,672
Patented Aug. 11, 1970

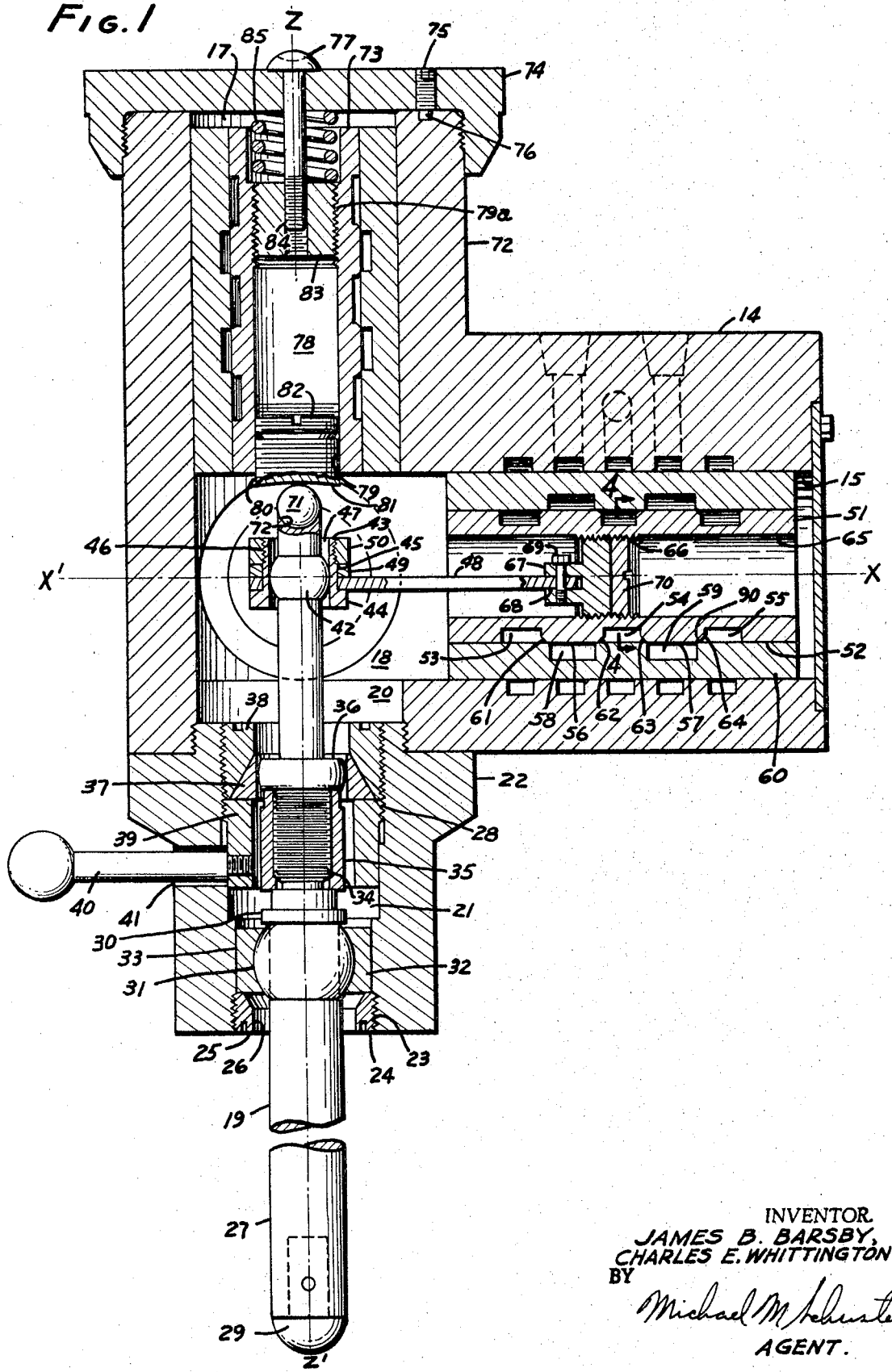

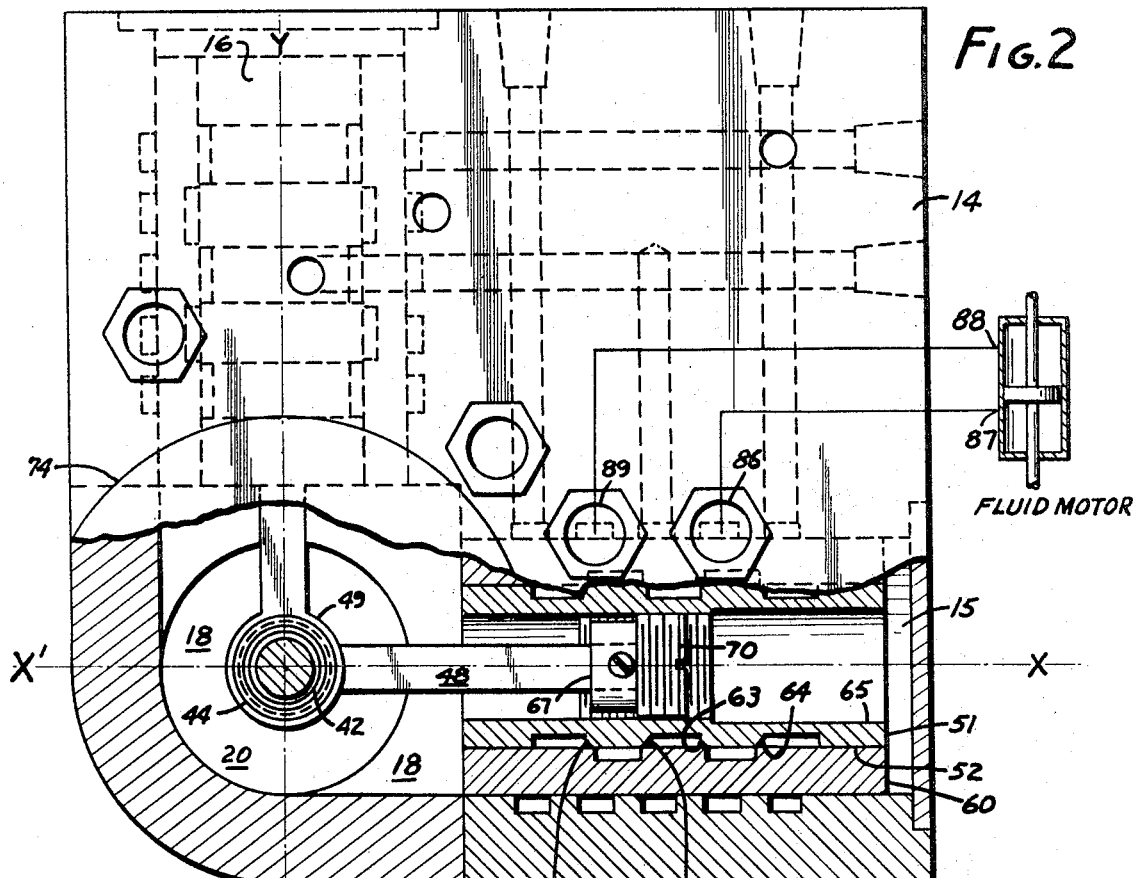
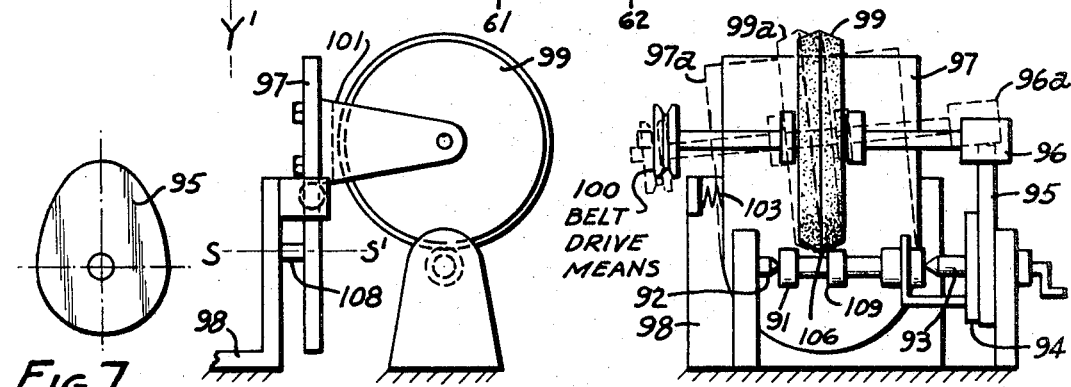

3,523,672
TRACING VALVE
James B. Barsby, Los Angeles, Calif. (6477 Atlantic Ave., Long Beach, Calif. 90805), and Charles E. Whittington, La Puente, Calif. (17321 Mapes Ave., Cerritos, Calif. 90701)
Filed Aug. 30, 1965, Ser. No. 483,501
Int. Cl. B23q 35/16
U.S. Cl. 251—3        5 Claims

ABSTRACT OF THE DISCLOSURE

This invention relates to tracer valve mechanisms which are used to control and actuate hydraulically operated devices which, in turn, are used to control and actuate the movement of a table of a machine bearing a workpiece or the movement of a tool such as a milling cutter or other cutting tool, for reproducing the shape of a template or model onto a workpiece. This invention specifically concerns itself with the transmittal of motion from a tracing stylus to valve spools, and the construction of the valves and valve spools to ensure a controlled flow of hydraulic fluid as the valve spool is shifted by the tracing linkage. The tracing stylus utilizes spherical surfaces and ball-like members to transmit motion to links which move the spools of the control valves to control flow of hydraulic fluid to the machine actuating devices. This construction permits control of motion in three dimensions with no critical points or angles of operation to cause pauses or irregularity in spool motion, but still permits independent motion on any spool axis since motion of the stylus can be in any direction or combination of directional movement.

---

This invention relates to tracer valve mechanisms adapted for use with hydraulically operated devices which control the movement of a machine or a tool such as a milling cutter or other cutting tool, for reproducing the shape of a template or model.

Tracer valves are well known in the art, as are hydraulic tracing means for duplicating workpieces through use of a stylus tracing a pattern or model. Such mechanisms are well and completely described in Pat. No. 2,331,817, issued Oct. 12, 1943, to M. Turchan, et al. and Pat. No. 2,391,492, issued Dec. 25, 1945, to M. Turchan et al. Further explanations may be found in Pat. No. 2,036,362 issued Apr. 7, 1936 to B. Sassen et al., and Pat. No. 2,706,-892 issued Apr. 26, 1955 to H. Fritschi et al. Since this invention deals with transmittal of motion from the tracing stylus to the valve spools and construction of the valve spools to ensure an approximately constant and controlled flow of hydraulic fluid as the valve spool is shifted by a linkage, the description will deal primarily with the invention leaving detailed information on the over all operation of hydraulic tracing systems for study when necessary in the available body of art in this field.

An object of this invention is to provide an improved tracing mechanism which may be adapted for either two-dimensional or three-dimensional tracing.

A further object of this invention is to provide a tracing stylus that will provide equal linkages to valves whose axes are coplanar and concurrent at a point, and will further provide ease of adjustment for balancing the tracer valves with respect to the undeflected position of the tracer stylus.

A further object of this invention is to provide motion of the stylus in the direction perpendicular to a pair of valves having coplanar axes concurrent at a point to actuate a third valve without a resultant effect upon the position of the pair of concurrent valves.

A further object of this invention is to provide valve ports which act in conjunction with a modified valve spool to provide a constant flow of hydraulic fluid to the fluid motor with the actuation of the tracer valves by the tracer stylus. Still another object of this invention is to start fluid in the system without pulsations.

A prime object of this invention is to provide co-action through the stylus linkage to the valve spools with minimum of joint clearances required and a motion which is constant for all spools with no critical points or angles of operation of the stylus which cause pauses or irregularity in spool motion.

A further object of this invention is to provide a lightweight, inexpensive linkage between three mutually perpendicular valve spools and a central tracing stylus for use in conjunction with hydraulic tracing mechanisms.

A further object of this invention is to provide a valve spool that will act in conjunction with a tracing spindle linkage to provide uniform flow of hydraulic fluid with increased deflection of the tracing stylus and resultant increased movement of the linkage and the associated valve spools.

The foregoing objects and other features of my invention will be better understood from the following detailed description, and the associated, accompanying drawings, of which:

FIG. 1 is a front elevation partially in cross section of an embodiment of the invention contained in a typical tracer valve;

FIG. 2 is a plan view of the tracer valve partially in cross-section;

FIG. 3 is a flow chart;

FIG. 4 is a fragmentary cross section of a valve spool taken through 4—4 of FIG. 1 and shown in perspective, with an embodiment of the invention shown:

FIGS. 5 and 6 are side and front elevations of a method for generating the surface shown in FIG. 4;

FIG. 7 is a view of a cam shown in FIG. 6.

An embodiment of the invention is shown in FIG. 1 and FIG. 2. As in all conventional three-dimensional hydraulic tracing valves, there is a body member 14 containing three mutually perpendicular valve chambers 15, 16 and 17. The axes of these valve chambers conveniently labeled X–X', Y–Y' and Z–Z' are concurrent at a point wth in a linkage housing chamber 18 and the valve parts for each axis will be identified with X, Y and Z prefixes when necessary for clarity and location. The housing chamber 18 for the linkage is adapted with fittings to retain a tracing stylus 19 through an open passage 20 which is located coaxially with the Z–Z' axis. Since the subject of this invention resides inthe stylus linkage construction and its method of imparting motion to the three valve spools and to the structure of the valve spools to gain the maximum advantage from the efficient linkage system, these devices will be described in detail while the general application of this class of stylus-actuated hydraulic tracing valves operating machine tools will rely on the referenced prior art for description of overall systems, since these systems are common and in wide use.

Linkage housing chamber 18 has installed within its passage 20, in coaxial relationship, a nose member 22 which is adapted in the following manner to carry the stylus 19, and is fixed to housing body member 14. Nose member 22 has a longitudinal bore 21 which is located on the Z–Z' axis of the valve. The longitudinal bore 21 has an internal thread 23 which is adapted to receive a spanner nut 24 to partially close the open end 25 of the bore 21. The spanner nut 24 has a longitudinal bore 26 which is provided with clearance over cylindrical diameter 27 of the tracing stylus 19. The nose member 22 has a second internal thread 28 at the end adjacent the linkage housing chamber 18. The purposes of this thread 28 is to accommodate bearing and adjustment means for stylus motion control surface 34. This bearing means will be described in conjunction with the structure of the stylus 19.

The stylus 19 is adapted to receive a tracing point 29. The stylus has a smooth cylindrical surface 27 which terminates in a shoulder 30. A first ball-like member 31 is pressed on surface 27 against shoulder 30. Split bearing means 32 envelopes ball-like member 31 and is slidable in nose-member bore 33 and is prevented from sliding downward by spanner nut 24. Extending beyond the shoulder there is an external thread 34 which accommodates a spacer nut 35. Formed on this spacer nut is a ball-like shoulder 36 having its periphery in the form of a segment of a sphere located at the end of the nut 35. This shoulder 36 is pressed into the smooth bore of tapered member 37. An internally tapered stop nut 38 is installed in thread 28 to coact with the external taper of tapered member 37 to limit motion of stylus 19 in X–X', Y–Y' and Z–Z' directions and all components thereof. Feed adjustment nut 39 is rotatable in thread 28 of nose member 22 by use of handle 40 extending through a slot 41 in the nose member 22.

The stylus 19 has a ball-like surface 42 spaced axially from shoulder 36. The ball-like surface 42 is enveloped by a bearing member 43. The bearing member 43 has an internal bore 47 which is a selected fit on ball-like surface 42 with clearances allowable in the order of .000050 of an inch. The bearing member 43 is adapted with the external features of a shoulder 44, a smooth cylindrical bearing surface 45 and an external thread 46. Flat link member 48 and 49 have a first end adapted to engage cylindrical bearing surface 45 rotatably with a similarly selected fit as previously described for bore 47, and are retained on bearing member 43 with lock nut 50.: Link members 48 and 49 are identical in construction as are the associated X-valve spool and Y-valve spool, therefore the construction of link 48 and its associated X-valve, as described will apply to link member 49 and its associated Y-valve. X-valve spool 51 has an external cylindrical surface 52 which is provided with fluid passage grooves 53, 54 and 55. X-valve spool 51 is further provided with shoulders 56 and 57 which co-act with grooves 58 and 59 in valve sleeve 60 to prevent fluid flow or to allow passage of fluids as the position of the spool dictates. Further, valve shoulders on spool 51 are provided with generated surfaces 61, 62, 63 and 64 whose function will be described later. X-valve spool 51 is provided with an axial bore 65 which has contained, axially spaced from both ends, an internal thread 66. A link retaining member 67 is adapted to be held by thread 66. Link retaining member 67 has a clevis portion 68 which is adapted to retain and encompass the second end of link 48 with close fit. Link 48 is retained in clevis 68 by clevis pin 69. A lock nut 70 is provided to insure relative position of link retaining member 67 after adjustment within X-spool 51.

A ball member 71 is retained in a cavity 72 at the end of stylus 19 remote from the tracing point 29. The ball member 71 is adapted to transmit motion to Z-axis valve spool 73. Z-axis valve chamber 17 has a closure which is cap-like member 74 threadably engaged to the Z-axis valve housing 72. Z-valve spool 73 has external features identical to the X and Y valve spools. Therefore the description applying to the one X-valve spool will suffice for the others. Cap member 74 is adapted with a pilot screw 75 which limits rotation to 90 degrees in groove 76 and enables shift of spool without recourse to stylus 19 by rotating cap member 74 and raising spool 73 with shoulder screw 77. The internal features of Z-axis valve spool 73 differ from those of X-axis spool 51 and the Y-axis spool in the following manner: Z-valve spool 73 has a longitudinal bore 78 which is adapted at each end with internal threads 79 and 79a. Internal thread 79 carries a threaded plug 80 which has a spherical surface 81 at the end facing the linkage housing chamber 18. A lock nut 82 may be conveniently used to hold plug 80 in position with respect to Z-valve spool 73. The spherical surface 81 of plug 80 must be of a radius equal to the distance from the end of ball member 71 to the swivel point on first ball member 31 so that rotation of stylus 19 about the pivot point of ball member 31 will not move the Z-spool 73. Thread 79a at the other end of Z-valve spool 73 carries a threaded plug 83 which is adapted with a tapped hole 84 that mounts the shoulder screw 77 and is further adapted to guide a bias spring 85 which urges valve spool 73 toward linkage chamber 18, this travel being limited by ball member 71. Shoulder screw 77 is slidable in cap member 74 and lifts spool with rotation of cap member 74.

To further describe the construction of shoulders 56 and 57 on X-axis spool 51, which are identical in construction to the shoulders on the Y and Z-axes valve spools, a brief description of the function of the valve spools is desirable, although it is well covered in the prior art cited. Shifting valve spool 51 toward linkage chamber 18 causes surface 62 and 64 of spool shoulders 56 and 57 to overlap annular grooves 58 and 59 of the valve cylinder 60. This permits passage of pressurized fluid through the various annular grooves 58 and 59 of the valve cylinder. This permits passage of pressurized fluid through the various internal conduit channels, as has been amply described in the prior art, to exit through port 86, to enter one side 87 of an actuating fluid motor used to operate a machine tool mechanism and allowing oil from the other side 88 of the fluid motor to return oil from side 88 of the fluid motor to return through port 89. Since the fluid motor is used to actuate motion of either a work piece into a cutter or a cutter into a work piece it is essential that the feed rate of the fluid motor be constant to avoid overloading the cutting process. A constant feed rate is only possible with a constant flow of hydraulic fluid. To provide for a constant flow of hydraulic fluid there must be a combination of easily controlled movement of the spool and gradual opening of the valve cylinder grooves by sliding of the spool shoulders 56 and 57. As the shoulder slides across the edge, for example edge 90 of the groove 59 in the valve cylinder 60, hydraulic fluid will start to flow from port 86 into side 87 of a hydraulic motor. Edge surface 63 of shoulder 57 of valve spool 51 has been described as a generated surface. This surface is generated by a line generator as shown in FIG. 4 and called W–W'. The line generator W–W' at any discrete point on the surface will make an angle B with the axis of the valve spool. Angle B will change in value for each position of line generator W–W' on the generated edge surface 63 of the spool shoulder 57. Another position of the line generator $W_a$—$W_a'$ is shown with a corresponding angle $B_a$. By allowing angle B to decrease from origin point of generation marked 89 to a maximum acute angle at point 90, located 180° around the edge from origin 89, on the generated surface it is possible to adjust the flow so that the shift of the spool will allow fluid to flow at a constant rate, instead of at a continually increasing rate as has heretofore been the case. The flow chart FIG. 3, curve A, shows how a sharp edged shoulder would have a rapidly increasing flow with spool shift while a generated surface could start flow gradually as in section C of curve E and then level out as in Section D of curve E. The variation of angle B does not have to be a constant function since an initial flow must be established in a gradual manner to prevent surges or pulsations and will then be held constant by variation of the angle B to control the amount of surface to groove edge overlap which determines area available for flow. A convenient way of generating such a surface is shown in FIGS. 5 and 6 where a valve spool 91 is conveniently mounted between centers 92 and 93 which are mounted to a machine table. Center 93 is mounted to a face plate 94 which is adapted to rotate spool 91. A cam 95 is rotated with face plate 94 and actuates a cam follower 96. The cam follower 96 is mounted to impart rotation to a plate member 97 which is swivelly mounted in a fixture 98. A grinding wheel 99 is mounted on the plate member 97 and driven by belt drive means 100. The grinding wheel mount 101 is adjustable in plate 97 by loosening bolts. Spring bias means 103 is fixed to fixture 98 and applies force against plate 97 to keep cam follower 96 in contact with cam 95.

In use, grinding wheel 99 is dressed to two conical surfaces which meet at a circular line which is the maximum diameter of the grinding wheel 99. The acute angle that the conical surfaces make with axis of the grinding wheel 99 is the minimum angle desired on the valve spool 91 and is indicated as angle B in FIG. 4 formed by line generator W–W′. The grinding wheel 99 must be adjusted after dressing so that its lowest point 106 swivels about axis S–S′ of bearing 108 which mounts wheel 99 for rotation with respect to fixture 98. The grinding wheel 99 is fed into the edge 109 of spool 91 and the spool is rotated by crank 107 which causes cam 95 to actuate cam follower 96 rotating the grinding wheel 99 about axis S–S′ thus generating an edge as shown in FIG. 4 as its included angle B, made with the axis of the spool 91 increases at a rate to decrease the effective aperture made in conjunction with a valve insert groove edge such as 90 in FIG. 1 and therefore restricting increase of flow with movement of the spool. For illustrative purposes the spool edge is shown with only one minimum angle location but it is possible to have the minimum angle in two or more locations, as the valve size and flow dictate, by modifying the cam.

The operation of this hydraulic tracing valve mechanism embodiment is as follows: Pushing tracing point 29 toward a template causes tracing stylus 19 to pivot about ball-like member 31. This in turn causes ball-like shoulder 42 to impart motion to link 48 which through link retaining member 67 shifts the valve spool 51 to permit fluid to flow through valve cylinder grooves 58 and 59 for the X-valve 15 and similar action for the Y-axis valve 16. Spherical surface 81 on plug 80 of valve spool 73 on the Z-axis permits transverse rotation of the tracer stylus 19 without transmitting motion to Z-axis valve spool 73. In tracing from a three dimensional model upward motion is imparted to stylus 19 which causes ball 71 to push upward and shift valve spool 73 against the bias of bias spring 85. This will allow passage of fluid to a vertical movement cylinder in the very same manner as accomplished and explained for the X-axis valve and as explained in referenced prior art. In order to balance the valve so that there is no fluid flow when the stylus is in its vertical or neutral position the valve spools must be adjusted so that the shoulders on spools co-act with the grooves in the valve cylinders to shut off flow. This adjustment may be conveniently done in the X and Y-axis spools by loosening, for example, locknut 70 of X spool and rotating the spool 51 so that it translates along the thread 66 since the threaded clevis member is held against rotation by the link 48. The Z-axis spool 73 may be balanced by loosening lock nut 82 and rotating plug 79 on its thread to raise or lower plug 79.

This invention thereby provides a hydraulic valve spool operating linkage which has the advantages of simplicity of structure, ease of operation, lack of necessity for excessive bearing clearances which produce backlash and null points, ease of adjustment for balancing and a constant rate of flow of fluid with the spool shift together with relief from hydraulic pulsation effects.

We claim:

1. In a hydraulic tracing valve used for machine control in duplicating parts from a model and having three mutually perpendicular valve housings on a common body, and utilizing sliding valve spools in these housings, said spools and housings being located on mutually perpendicular coordinate axes defined as first, second and third axis, which meet at a common point in a linkage chamber into which all three housings open, said linkage chamber having a passage coaxial with said first axis adapted for mounting tracing means, said housings having internal grooves which co-act with external grooves and shoulders on said spools to permit passage of hydraulic fluid to actuate machine motions, an innovation in a tracing stylus linkage coupled to said sliding valve spools which comprises: a stylus; said stylus having a first end protruding from said linkage chamber, said first end adapted to receive means for folowing a contour of a model; bearing means in said passage of said linkage chamber adapted to retain said stylus with universal swivel action, and said bearings means adapted to permit movement of said stylus in a longitudinal direction along the first axis; a ball-like shoulder on said stylus spaced from said bearing means; a second bearing member, said second bearing member adapted to envelope said ball-like shoulder; a pair of flat link members, said flat link members rotatably mounted to said second bearing member in the plane containing said second and third axis: a pair of clevis members, said clevis members mounted to said second axis valve spool and said third axis valve spool, said clevis member adapted to retain said flat link members, a ball-like surface at the end of said stylus opposite said first end, a spherical seat on said first axis valve spol, spring means biasing said first valve spool and said spherical seat against said ball-like surface, the tracing stylus linkage adapted so that motion of the stylus in the first axis direction will shift the first axis valve spool and universal swivel motion of the stylus will shift the second and third axis valve spools to permit fluid flow.

2. Apparatus as described in claim 1 which includes said pair of clevis members threadably engaged with said second and third axis spools and locking means for said clevis members, said clevis members and said spools adapted for adjustment of said valve spools by rotation of said spools to adjust relative positions of said internal groves of said second and third axis valve housings and said external grooves and shoulders of said second and third axis valve spools and use of said locking means to maintain relative position between said clevis members and said spools.

3. Apparatus as described in claim 2 which includes a plug, said plug threadably and coaxially engaged to said first axis spool, said plug adapted with said spherical seat on said first axis spool, said plug adapted with locking means so that rotation of said plug will shift said first axis spool for adjustment of relative positions of said grooves of said first-valve housing and said grooves and shoulders of said first valve spol to prevent fluid flow with the stylus in a neutral position.

4. Apparatus as described in claim 1 which includes said shoulders of said valve spools with edges modified by a canted surface, said canted surface generated by a line generator, said line generator forming an acute angel with the axis of said spool, the acute angle varying in magnitude as the line generator moves around the edge.

5. In a hydraulic tracing valve used for machine control in duplicating parts from a model and having three mutually perpendicular valve housings on a common body utilizing sliding valve spools in these housings, said spools and housings being located on mutually perpendicular first, second and third coordinate axes, said first and second axes in a horizontal plane, said third axis in a vertical plane, said axes meeting at a common point in a linkage chamber into which all three housings open, said housings having internal grooves which coact with external grooves and shoulders on said spools to permit passage of hydraulic fluid to actuate machine motions, a tracing stylus linkage coupled to sliding valve spools which comprises: a stylus; said stylus adapted to be installed in said linkage chamber, said stylus having a first end protruding from said linkage chamber, said first end adapted to receive means for following a contour of a model; a first ball-like bearing surface; a spherical bearing member adapted to mount said first ball-like bearing surface in said housing chamber; said spherical bearing member adapted to move slidably in the housing coaxial with said third axis; stopping means in said housing member to restrict downward travel of said sliding bearing means; a second partially ball-like shoulder spaced axially a distance from said first ball-like bearing means along said stylus; an internally tapered member mounted in said housing chamber, an externally tapered member adapted to be mounted on said second shoulder, adjustment means for spacing said externally tapered member from said internally tapered member; a third ball-like surface on said stylus spaced axially from said second ball-like shoulder in a direction along the stylus opposite from that of said first ball-like bearing means; a bearing member encompassing said third ball-like surface, said bearing member having a smooth bore, said ball-like surface pressed into said smooth bore in a close fitted sliding relationship; an external cylindrical surface on said bearing member said cylindrical surface having a shoulder formed at one end and a thread formed at the second end; a pair of flat links, said links having a first end and a second end, said first end of each link adapted to fit closely with said cylindrical bearing surface of said bearing member; a retaining nut, said retaining nut adapted to fit the thread on said bearing member and to retain said links on said member, allowing said links to rotate freely on said bearing surface; a first axis valve spool and a second axis valve spool, said spools having a hollow construction with a bore extending axially through said spools, said bore having a threaded section, said internal threads of said threaded section engaging a threaded clevis member, said threaded clevis member adapted to retain said second end of said pair of flat links; nut locking means, said nut locking means adapted to lock said threaded clevis members in position in said valve spools and to lock valve spools with relation to said threaded clevis members; a fourth ball-like surface on said stylus; a third axis valve spool, said third axis valve spool having a first end and a second end; said first spool end installed in said third axis valve housing toward said linkage housing chamber; a threaded plug, said threaded plug installed in said first end of third axis spool, said threaded plug having a spherical radius on one end, said spherical radius extending into said housing chamber, a bore through said third axis valve spool, said bore terminating in an internal thread extending to said second end of said third axis spool, a threaded plug installed in said second end of said third axis spool; spring means, said spring means biasing said third axis spool toward said stylus, said fourth spherical surface of said stylus in contact with said spherical radius of said plug in said first end of said third axis valve spool, said threaded plug on said second end of said third axis valve spool adapted to retain means for holding said valve spool at a determined distance from an enclosure of said valve housing against said bias of said spring means, said external shoulders on said first, second and third valve spools having edges, said edges of shoulders modified by a generated surface, said generated surface being generated by a line generator varying in angle with respect to said axis of said spools, whereby movement of said spools by said tracing stylus linkage will permit hydraulic fluid to flow at a rate that is substantially constant despite the movement of the tracing stylus and translatory movement of the valve spools.

References Cited

UNITED STATES PATENTS

| | | | |
|---|---|---|---|
| 2,347,368 | 4/1944 | Rosen | 91—413 |
| 2,835,466 | 5/1958 | Rosebrook | 251—3 |
| 2,958,340 | 11/1960 | Rosebrook | 137—625.69 |
| 2,994,502 | 8/1961 | Ruzick et al. | 251—3 |
| 2,984,259 | 5/1961 | Rosebrook | 251—324 |

WILLIAM F. O'DEA, Primary Examiner

R. GERARD, Assistant Examiner

U S. Cl. X.R.

29—157.1; 51—3, 281; 137—625.69